United States Patent [19]

Groeschel

[11] 4,140,958

[45] Feb. 20, 1979

[54] BATTERY CHARGING APPARATUS

[75] Inventor: Charles R. Groeschel, Houston, Tex.

[73] Assignee: Resource Engineering, Inc., Houston, Tex.

[21] Appl. No.: 781,981

[22] Filed: Mar. 28, 1977

[51] Int. Cl.² .............................................. H02J 7/04
[52] U.S. Cl. ........................................ 320/14; 320/39; 320/DIG. 1
[58] Field of Search ............... 320/13, 14, 48, 9, 8, 320/DIG. 1, 39, 40

[56] References Cited

U.S. PATENT DOCUMENTS

| | | | |
|---|---|---|---|
| 3,417,307 | 12/1968 | Kosa et al. | 320/14 X |
| 3,454,859 | 7/1969 | Ford et al. | 320/13 X |
| 3,596,164 | 7/1971 | Bise et al. | 320/9 |
| 3,889,170 | 6/1975 | Sarbacher et al. | 320/14 |
| 3,970,912 | 7/1976 | Hoffman | 320/DIG. 1 X |

Primary Examiner—Robert J. Hickey
Attorney, Agent, or Firm—Donald Gunn

[57] ABSTRACT

A battery charging and analyzing apparatus for a nickel-cadmium battery is disclosed. The equipment utilizes a type of solid state resistor formed of a plurality of paralleled emitter follower transistors which are collectively a load for a Ni-Cid battery. The apparatus senses the requirements for charge and adjusts a control voltage which is compared with a reference voltage. The control voltage is applied to a circuit which conditions a signal to adjust the conductivity of the emitter follower transistors as required. When the device is switched on or off by the application of power, charging or discharging through the solid state resistor (SSR) is accomplished. This is accomplished over a timed interval.

19 Claims, 4 Drawing Figures

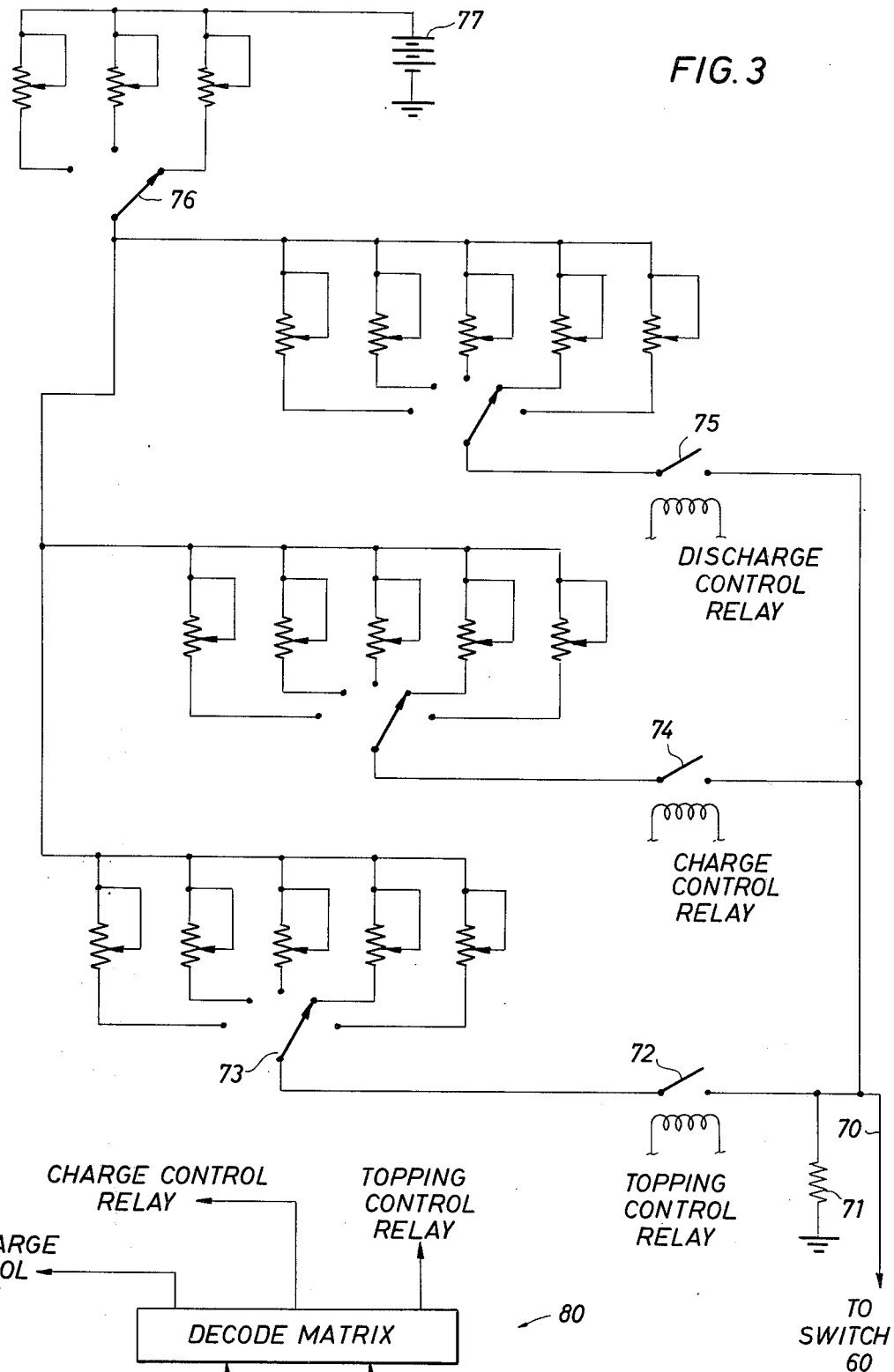

BATTERY CHARGING APPARATUS

BACKGROUND OF THE INVENTION

Ni-Cd batteries are often used in the aircraft industry. They have many advantages for aircraft applications. There is, however, some difficulty in charging Ni-Cd batteries. They cannot be tested by reading the specific gravity. The beginning point is hard to determine. In charging them, the beginning point is usually an initial partial charge. Usually, it is not possible to measure the precise amount of charge already in the battery. The size of the charge in the battery limits the additional amount of charge permitted. Battery size limits or determines the rate at which additional charge can be forced into the battery. Surprisingly, it has been discovered that it is better to initially discharge a Ni-Cd battery to some minimal level. Thereafter, it is charged for a stated interval. The charging rate is high for this interval. The charging rate during charging is constant; it is, however, preferable to charge with periodic interruptions. It has been found that the chemical reactions within the battery required to produce the charging reaction are aided by these periodic interruptions. These interruptions are superimposed on the existing analog charge signal with both rate and duty cycle of these interruptions being adjustable. Once about 90% of the full charge is placed in the battery, the rate is cut by about 75% to 90% to top off the charge. Eventually, the battery is charged to a level determined by elapsed time and charging rate and when this is accomplished, the battery is then ready for use.

The present invention is a device which charges Ni-Cd batteries without regard to their initial charge level by first discharging the battery. Moreover, it is able to charge a single battery or multiple batteries repeated numbers of times without limitations on its operation. The functioning of the device will become more apparent upon a description of the device which follows.

SUMMARY OF THE DISCLOSURE

The present invention is a battery charging apparatus. A transformer and bridge provide DC current. The DC current is impressed on the battery. The battery itself, however, is in series with a solid state resistor. The solid state resistor is a bank of emitter followers in parallel. The signal applied to the base drives them in a fashion to control charging and discharging rates. The drive voltage for the base of the solid state resistor is obtained from a comparator which senses the rate of charge. At periodic intervals, it is interrupted by a voltage from a timer which shuts off the equipment. More will be noted concerning the timing of the equipment hereinafter.

DESCRIPTION OF THE DRAWINGS

FIG. 3 is a resistive network forming suitable control voltage for controlling the battery charging apparatus; and FIG. 4 is a clock for timing the charging process.

DESCRIPTION OF THE PREFERRED EMBODIMENT

Figure 1:
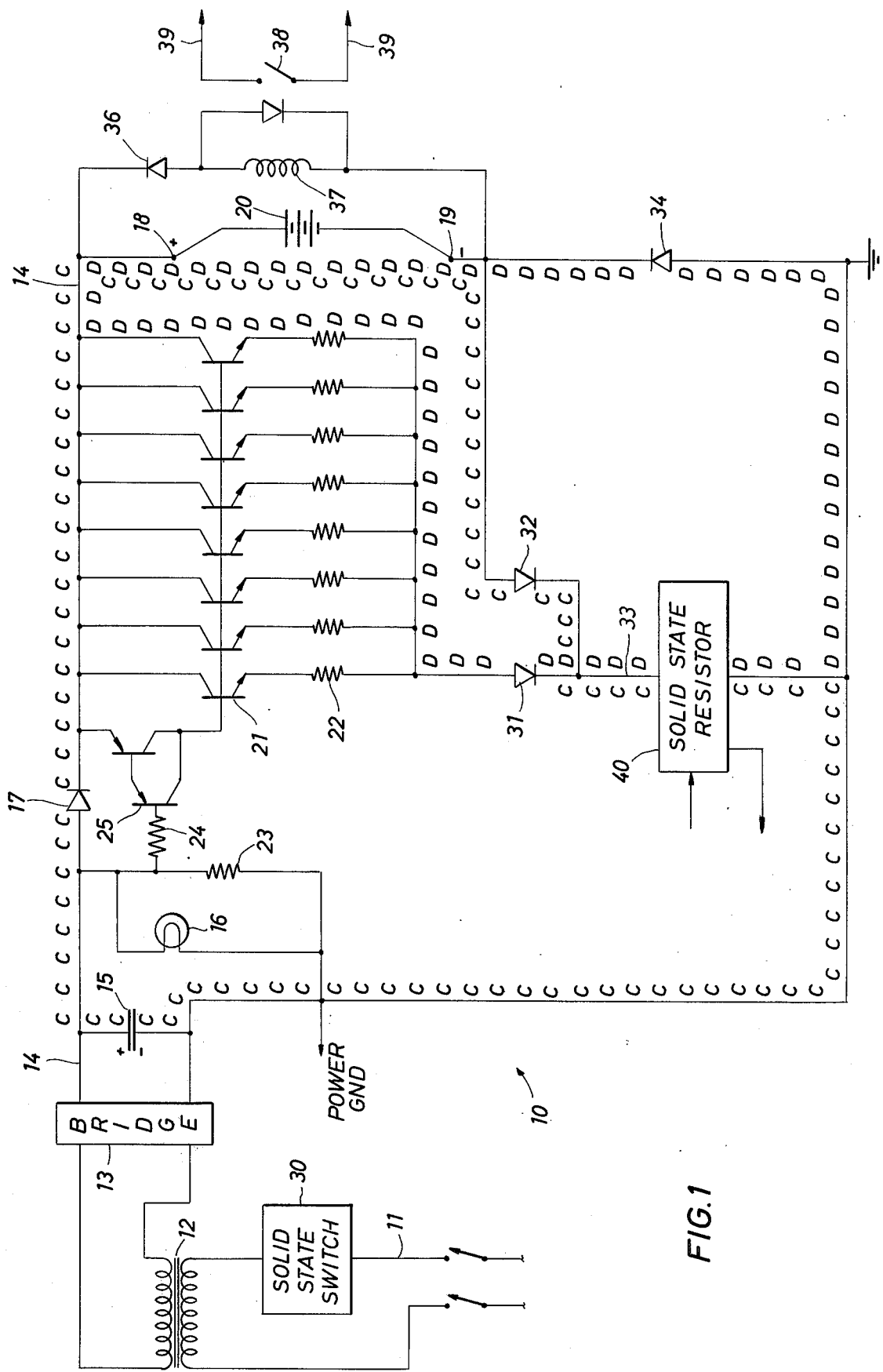
FIG. 1 is a schematic wiring diagram of the battery charging apparatus of the present invention.

Attention is directed to FIG. 1 of the drawings. In FIG. 1, the numeral 10 identifies a battery charging apparatus of the present invention. It is connected to a particular battery 20 to be charged. The battery 20 is a Ni-Cd battery of typical construction used in the aircraft industry. The Ni-Cd battery 20 is temporarily connected to the charger so different batteries can be charged with the same charger. In any case, the charger is scale for a typical nominal rating of the battery such as 24 volts. This can be changed inasmuch as the terminal voltage is only a scale factor which can be modified by selecting different turns ratios for the transformer as will be understood upon reading the present disclosure. In any case, the present invention will be described, beginning with the connection with a suitable AC voltage source.

The numeral 11 identifies conductors which are suitably connected to an AC source. The conductors 11 are connected to the primary of a transformer 12. The transformer is a step up or step down transformer depending on the voltage level to be achieved. The voltage level of the battery 20 determines the ratio between the primary and secondary terms. The secondary of the transformer 12 is connected to a bridge circuit 13. This forms rectified pulses which are impressed on a conductor 14. A fair amount of ripple in the DC level on the conductor 14 is noted. The ripple is smoothed to some extent by a capacitor 15 connected across the conductor 14 to ground. The smoothing capacitor 15 has a size which is variable, a larger capacitance being desirable to obtain more smoothing. Larger capacitors are more expensive and accordingly, it is not necessary to provide an extremely large capacitor for smoothing purposes. The present invention works quite well with a degree of ripple in the DC level applied to the battery 20. The ripple is absorbed within the solid state resistor so DC is applied to the battery.

A pilot light 16 is connected across the capacitor to ground and forms a signal indicating that the equipment is on or off. The light 16 is traditionally a constant current device and also discharges the capacitor at a constant rate when the AC current is switched off.

A series blocking diode 17 is incorporated in the conductor 14. It then connects directly to a positive terminal 18 for connection with the battery 20. The negative terminal 19 is additionally connected to the battery. These terminals 18 and 19 may have the form of a pair of large diameter conductors which extend from the equipment to the battery. For instance, the battery charging apparatus 10 may be located on a service cart while the battery itself may be mechanically mounted in an aircraft. The terminals 18 and 19 are thus conveniently long cables. In any case, they are able to be connected from the charger 10 across a suitable distance to connect with the battery. Preferably, they are large gauge conductors having a minimum of series resistance.

The numeral 21 identifies a transistor connected to the conductor 14. The transistor 21 has a series resistor 22 in the emitter circuit. The resistor 22 balances out differences between the parallel transistor 21. It will be observed that the transistor is duplicated a specified number of times. A fairly heavy current will flow through this transistor during discharge. Because the current is fairly large, multiple transistors are used. The number of actual transistors depends on the size of the current, the size of the transistors, the cooling provided for the transistors, and other scale factors. It is sufficient to note that anywhere from two to fifteen typically will accommodate most current levels. Under more extreme conditions, the number of transistors will be increased. There is no real theoretical limit to this.

The transistor 21 is turned off by the signal applied to its base during charging. The signal applied to the base is substantially less than the level applied to its collector. The base signal gates this transistor on during discharge. The base drive signal is obtained from the following source. The numeral 23 identifies a resistor connected to ground. It is in parallel with the pilot light 16. It is connected to an additional resistor 24. The resistor 24 is the source of the base signal applied to a Darlington amplifier. The output of the Darlington amplifier which is identified by the numeral 25 is itself applied to the base of the transistor 21. Certain representative or exemplary voltages will illustrate how this portion of the equipment operates.

When the battery is being charged, and presuming that a 24 volt battery is being charged, about 26 to 28 volts DC is impressed across the terminals. The capacitor and bridge place about 45 to 60 volts on the collector of the transistor 21 with the surplus voltage dropped across a solid state resistor in the form of excess DC and AC ripple. The signal applied to the base of the transistor 21 is fairly low. This signal is low for the purpose of switching off the transistor 21. At this point, it is sufficiently low that the current flow through the transistor 21 is only leakage current. It is so small as to be meaningless in the consideration of the rest of the equipment. Accordingly, no current flows through the several transistors 21.

When the battery is being discharged, the equipment can be conveniently placed in a discharge mode by operation of the solid state switch 30. In effect, this interrupts current flow on the conductor 14. When current flow is interrupted, the voltage level at the terminal 18 drops to the battery level which can be anywhere between 24 and about 21 volts for a nominal rating of 24 volts DC. At this point, the ground potential applied through the resistors 23 and 24 to the Darlington amplifier initiates conduction and raises the base voltage of the transistor 21. It is raised sufficiently to make it highly conductive. Thus, the transistor 21 conducts heavily and provides a discharge path through the large balancing resistor 22. The discharge path through the resistor 22 is through a series diode 31. The diode 31 is connected to a solid state resistor 40 which will be described in detail hereinafter.

Figure 2:
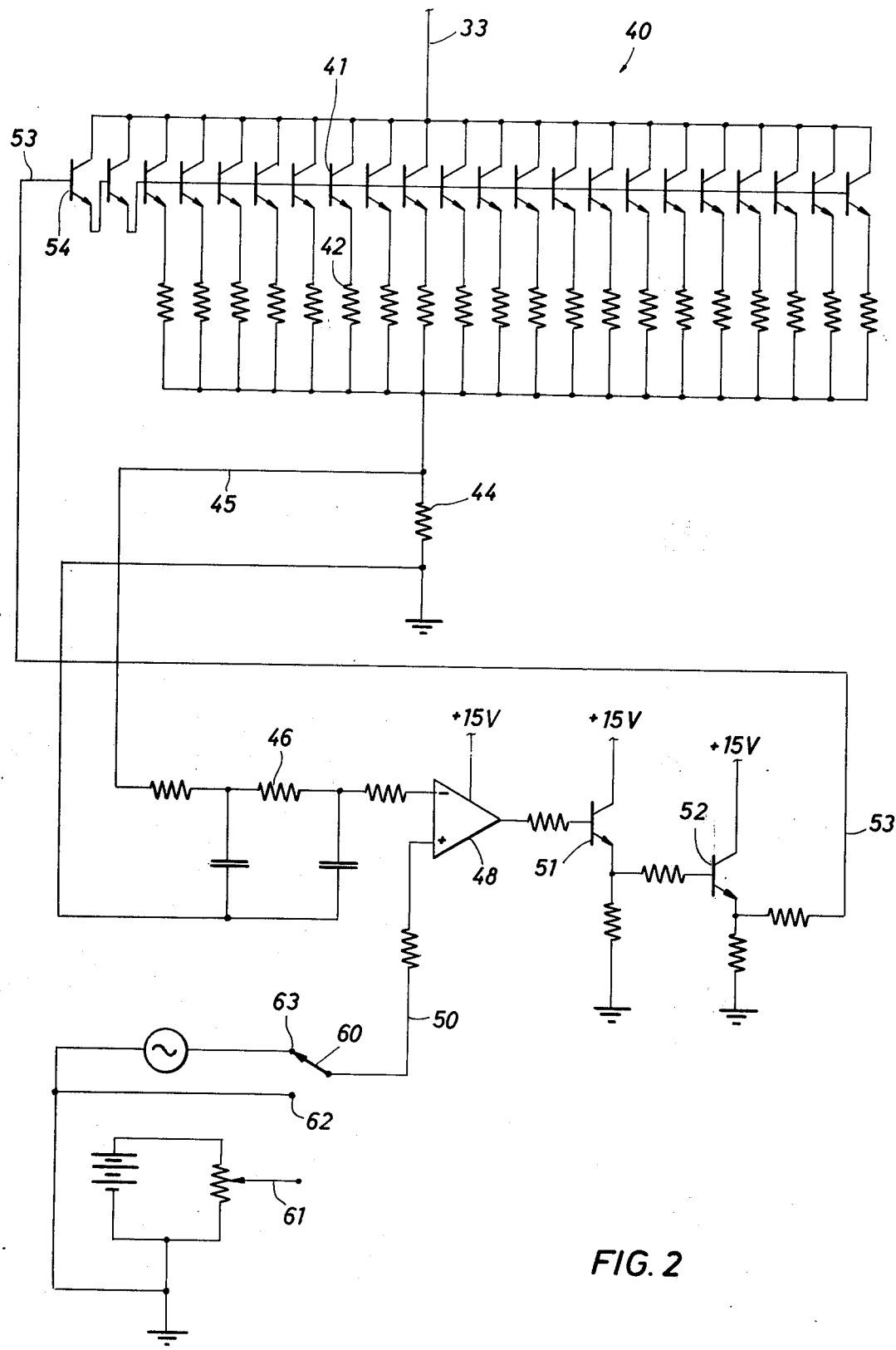
FIG. 2 is a detailed schematic of the solid state resistor shown in FIG. 1.

During charging, the current flows from the conductor 14 through the diode 17 the terminal 18, and the battery 20. The current then continues through the terminal 19 and through a charging diode 32. The diode 32 is a blocking diode which prevents current flow in the undesired direction. It will be observed that the diodes 31 and 32 join together at a common conductor 33 which is input to the solid state resistor 40. The conductor 33 is shown in FIG. 2 of the drawings connecting with the equipment illustrated thereat which will be described later.

For discharge, current thus flows from the terminal 18 through the transistor 21, the resistor 22, the diode 31, the conductor 33, and the solid state resistor 40. The circuit is completed by connecting the terminal 19 to ground through a blocking diode 34. The diode 34 is positioned in the circuit to limit the direction of current flow to the illustrated direction. The discharge path is thus complete as described which of course includes a ground connection as illustrated in FIG. 1.

Attention is next directed to the charging path. The charging path of the equipment includes the following. A charge is accumulated on the smoothing capacitor 15. The charge originates with the bridge circuit 13 and is smoothed by temporary storage at the capacitor 15. Charging utilizes current flow from the capacitor 15 on the conductor 14 through the diode 17 to the positive terminal 18 of the battery 20. Current flows into the battery. The return path extends from the negative terminal 19 of the battery through the diode 32, the input conductor 33 of the solid state resistor 40 and to ground. This thus describes the two paths. They are conveniently marked in FIG. 1 to set out the manner in which the device charges and discharges the battery. The stated construction allows easy transition from the charge to the discharge modes by simply turning on (charge) or turning off (discharge) the solid state switch 30. Efficiency is improved by using the components in the described manner, namely, in both charge and discharge cycles.

Further, the battery is not reconnected on changing from charge to discharge operations. The changeover is achieved without handling the connective cables and without using gigantic switching relays.

At this juncture, certain assessories are appropriately described. The numeral 36 identifies a blocking diode. The diode is in series with a reed relay 37. The reed relay has a set of contacts 38. The contacts 38 connect to conductors 39 which travel to a reverse connection indicator. The diode blocks the current flow through the relay 37 in the event the battery is correctly connected. In the event that it is connected in the wrong direction, the signal on the conductors 39 indicate reverse connection. Some type of alarm device is connected to the conductors 39 to form an alarm signal indicating that the battery has been incorrectly connected.

Attention is next directed to the solid state resistor 40 of the present invention in FIG. 2. The conductor 33 is input to the device. It will be observed that it is formed of a number of transistors 41 which are connected to emitter balancing resistors 42. A number determined by the current flow and other scale factors is selected. It is necessary to describe only one because they are all connected in parallel. The several parallel balancing resistors 42 is through a sampling resistor 44. It is quite small, typically in the range of about 0.1 ohms, and is preferably a precision or wire wound resistor of substantial power disappation. This sampling resistor creates a voltage drop which is dependent on and directly represents, current flow. The sampling resistor then connects to ground. The current flow through the sampling resistor forms a voltage level on a conductor 45. The conductor 45 is input through a filtering network at 46 which includes capacitors connected to ground and suitable dropping resistors. It is input to a differential amplifier 48. The amplifier 48 is provided with a command reference voltage on a conductor 50. This voltage will be discussed in detail hereinafter. For a given command voltage, the differential amplifier 46 forms an output which is applied through an emitter follower 51 and another emitter follower 52 to form a driving signal on a conductor 53. The signal on the conductor 53 is carried to the cascaded emitter followers at 54 which in turn drive the transistors 41. They are all connected in parallel on a common bus. It will be observed that the phase reversal is such that the current flow through the sampling resistor 44 is regulated precisely by the value of the command voltage. The transistors 41 collectively are controlled by the voltage applied to them. As the voltage drop across the resistor 44 increases indicative of increased current flow, a larger signal is formed. The signal is input by the conductor 45 to the comparator and a drive signal is formed on the conductor 53. The circuitry thus sets the current dependent on the command voltage. If the command voltage on the conductor 50 is high, the current flow through the solid state resistor 40 is high.

The command reference voltage is connected to a selected source. The source is selected to serve as a reference for the differential amplifier 48. Command reference voltage selected may be low to drive the circuitry to cut off and thereby prevent any current flow through the solid state resistor. In other words, it is switched off.

The command voltage is obtained by a switch 60 which is connected with one of several sources. Exemplary signal sources for the command voltage are shown. For instance, the switch 60 can be selectively positioned at a tap 61 which provides an adjustable voltage level. The tap 62 provides ground level. The tap 63 is connected with a suitable oscillator or other signal source providing a repetitive wave form. Several exemplary command voltages will be described and illustrated.

If it were determined that the battery should be charged at a rate of 40 amperes, a current flow of this magnitude will produce a four volt drop across the resistor 44 if the sampling resistor has a value of 0.1 ohm. To obtain this kind of performance in the equipment, the tap 61 is adjusted to four volts which is input to the comparator circuit 48. The signal on the conductor 53 is manipulated to cause 40 amperes to flow through the sampling resistor. When this occurs, the circuitry including the comparator 48 varies the signal on the conductor 53 to maintain a steady current level of 40 amperes. It will be recalled that some ripple is impressed on the DC voltage as a result of the rectification bridge. Some of the ripple is removed by the capacitor 15. The capacitor 15 however may not prevent ripple from flowing in the charging circuit. The solid state resistor 40 illustrated in FIG. 2 is able to remove a substantial part of the ripple by varying the effective resistance dynamically with the ripple. In other words, a steady charging current through the battery is achieved. The ripple is accommodated by altering dynamically the resistence of the means 40.

If the switch 60 were set to the tap 62, this would provide ground to the comparator 48 and it would shut off the solid state resistor 40. If the comparator 48 were connected through the switch 60 to a signal generator 63, the charging current would follow the shape of the wave form. If a square wave generator were utilized, the charging current would be dependent on the signal impressed on the comparator 48. The use of a square wave generator is particularly advantageous. A square wave having a duty cycle of about 90% on and 10% off with a pulse rate ranging anywhere between 40 pulses per second and slower and with a signal output ranging from zero to about four volts is ideal for gating the current flow in a square wave form having a current flow of up to about 40 amperes, again presuming the use of a sampling resistor having the specified value. Square wave generators are well known in the art and it is not believed necessary to illustrate one. The adjustments mentioned herein are also commonly available on square wave generators.

Consider the present device in operation. At the time of charging a battery, it is first discharged. The battery is connected to the terminals 18 and 19. The switch 30 is switched off, thereby preventing AC current flow through the transformer 12. The battery discharges along the discharge path indicated in FIG. 1. That is, current flows from the positive terminal 18, through the conductor 14, through a transistor bank 21 and the connected balancing resistors 22 and then through the blocking diode 31. The current flows through the conductor 33 and then the solid state resistor 40 to ground. The negative terminal 19 is connected through the diode 34 to ground to complete the discharge circuit. The specifications describing the battery being discharged may indicate that the discharge current should not exceed 25 amperes. A safe level might be disharged at a rate of 20 amperes. If this is the fact, the comparator is provided with a two volt signal and 20 amperes flows through the sampling resistor 44 provided it is the presumed value. The discharge current flows continuously until the battery is discharged. At a certain point in the discharge operation, the terminal voltage of the battery will drop precipitously indicating that it is fully discharged.

The next step is then to recharge the battery. The battery 20 is recharged by charging at approximately 100% of the maximum charging current flow. Presume that it is 20 amperes. This rate of current determined by adjusting the switch 60. Ideally, a pulsating charging current is applied and the generator for the tap 62 is adjusted to provide this wave form and amplitude. The amplitude and the cycle of the wave form is adjusted. The optimum pulsating rate is up to about 40 pulses per second. It can be adjusted to be slower. The maximum charging current is applied with a duty cycle of about 10% off and 90% on as mentioned before with the maximum permissible charging current flowing to the battery. This continues for a specified interval until the battery is approximately 90% charged. The high current is then reduced by about 75 to 90% for a "topping" charge. The topping charge is applied in a similar pulsating current pattern, typically a square wave pattern with a duty cycle of about 10% off and 90% on. It differs because it has a reduced rate of current, in the vicinity of 10 to 20% of maximum charging capacity of the battery.

When the topping charge is completed by charging the battery for a specified interval, the battery is removed and the battery charging apparatus 10 can be used with another battery.

Attention is directed to FIG. 3 of the drawings. There, a conductor to the switch 60 is illustrated. The switch voltage sources previously described are representative sources. They are more than adequate to operate the device by providing a suitable command voltage. FIG. 3 shows a more complex system which can be used to automatically set the equipment to charge different sizes of Ni-Cd batteries. It can be set to handle Ni-Cd batteries of different sizes and current storage capacities.

In FIG. 3, an output voltage on a conductor 70 is developed across a grounded resistor 71. A relay 72 forms a selected voltage from one of several adjustable dimensions, the choice being determined by a switch 73. The switch 73 selects an appropriate voltage level, the level being determined by settings of various adjustable resistors. A companion and duplicate bias circuit connects through a charge control relay 74. A discharge control relay 75 is also incorporated and is connected to a voltage source. The relays 72, 74 and 75 all connect to identical selected voltage sources.

The multitude of adjustable resistors all connect to a switch 76 which itself connects through two or more adjustable resistors to a voltage source 77. The source 77 provides a suitable DC level for the equipment. As will be understood, various and sundry resistors can be set to specified levels and left at those levels. Through the use of the switches, the equipment can be used to charge different size batteries while storing the settings for a given battery size. For pulse charging, the equipment of FIG. 3 can be used in series with a signal forming circuit such as a square wave generator. Thus, the voltage levels provided by the circuit of FIG. 3 determine the maximum values while the wave forming circuit imposes the necessary envelope on the maximum value.

These values could also be stored digitally as a 3 or 4 digit BCD value using a storage device such as the RCA CD 4061A. If field adjustment of these values is not required, the typical Read-only-memory (ROM) could be used in its place. Regardless of the storage device used, the values would be stored and arranged in at least a two or higher level dimensional matrix.

Attention is next directed to FIG. 4 of the drawings where the numeral 80 identifies a timer circuit. A suitable pulse source is connected to a register. The register is preferably provided with controls which enable it to be reset, advanced, and started. It connects to a decode matrix. The matrix is adjustable. It provides timed output signals for the discharge, charge, and topping control relays shown in FIG. 3. Thus, the equipment can be made automatic in the sense that a battery is connected to the battery charger 10, the timer equipment 80 is started and the battery is charged with the appropriate current levels and for selected times. A pre-selected discharge current rate is used, a preset charging rate is used, and a preset topping current flow completes the charging operation.

The present invention may be scaled to accommodate batteries of all sizes. It is particularly to charge Ni-Cd batteries. However, it can be used to charge other batteries, also. The foregoing is directed to the preferred and illustrated embodiment, but the scope of the present invention is determined by the claims which follow.

I claim:

1. A battery charging apparatus which comprises:
   (a) voltage source means for forming a DC charging current at a specified voltage to be applied to charge a battery;
   (b) a discharge circuit which connects from the positive terminal of a battery comprising a switch and a solid state controlled resistor means to selectively and controllably discharge the battery;
   (c) a charging circuit utilizing said voltage source connected in series with the battery and said solid state controlled resistor means to controllably charge the battery; and
   (d) wherein said solid state controlled resistor means comprises a differential amplifier circuit comparing two values to form a control voltage for control of said resistor means wherein said two values are derived from a set value and a value related to the charge condition of the battery.

2. The apparatus of claim 1 wherein said charging and discharging circuits share a common solid state controlled resistor means, and further including current directing diodes which selectively block and direct the flow of current in said charging circuit and said discharge circuit to an input terminal of said solid state controlled resistor means.

3. The apparatus of claim 1 wherein said switch comprises an emitter follower transistor having a base to which is applied a control voltage for switching said transistor off or on.

4. The apparatus of claim 1 including a source of a command voltage which source is adjustable, and wherein said solid state resistor means is selectively operated by the command voltage from said source.

5. The apparatus of claim 1 wherein said discharge circuit and said charging circuit operate for timed intervals determined by a timer means.

6. The apparatus of claim 1 wherein said charging circuit is controlled in its operation for a specified interval to provide a charging current by a timing means.

7. The apparatus of claim 1 wherein said charging circuit is operated at a reduced current level to provide a topping charge for the battery for an interval selected by a timing means.

8. A battery charging apparatus which comprises:
   (a) voltage source means for forming a DC charging current at a specified voltage to be applied to charge a battery;
   (d) a discharge circuit which connects from the positive terminal of a battery comprising a switch and a solid state controlled resistor means to selectively and controllably discharge the battery;
   (c) a charging circuit utilizing said voltage source connected in series with the battery and said solid state resistor means to controllably charge the battery;
   (d) wherein said solid state controlled resistor means comprises:
      (1) a base driven serially connected transistor and resistor connected together;
      (2) means for forming a control voltage for the base of said transistor,
      (3) which means comprises a comparator circuit means having two inputs,
         (i) one of which is a selected reference signal, and
         (ii) the other is a voltage level proportional to current flow through said solid state resistor; and
   (e) a series sampling resistor connected in said solid state controlled resistor means such that the current flow is directed through the sampling resistor to form a voltage drop thereacross which is input to said comparator circuit means.

9. The apparatus of claim 8 including a wave generator forming pulses at a selected pulse rate, amplitude and relative duty cycle as the reference signal.

10. The apparatus of claim 9 including a differential amplifier in said comparator means which forms an output signal which is input to a current amplifier which forms an output signal input to a set of transistors connected in parallel and in a number dependent on the current flow through said solid state resistor means, said parallel transistors being the serially connected transistor.

11. The apparatus of claim 10 wherein each of said transistors incorporates a series emitter resistor.

12. The apparatus of claim 11 including a common bus connected to said emitter resistors and said sampling resistor is connected from said bus to ground.

13. A battery charging apparatus which comprises:
   (a) voltage source means for forming a DC charging current at a specified voltage to be applied to charge a battery;
   (b) a discharge circuit which connects from the positive terminal of a battery comprising a switch and a solid state controlled resistor means to selectively and controllably discharge the battery;
   (c) a charging circuit utilizing said voltage source connected in series with the battery and said solid state resistor means to controllably charge the battery;
   (d) wherein said battery has positive and negative terminals and the positive terminal is connected to a first diode in said discharge circuit conductive to enable discharge current from the battery to flow through said solid state controlled resistor means;
   (e) a second diode connected from the negative terminal of the battery to flow charging current through said solid state controlled resistor means; and
   (f) a third diode having its cathode connected from the negative terminal of the battery to ground to conduct during discharge of the battery.

14. The apparatus of claim 13 including a common input terminal on said solid state resistor means connected to the cathodes of said first and second diodes.

15. The apparatus of claim 14 including a series sampling resistor connected to said first and second diodes and to ground, said resistor having a small value to create a relatively small voltage drop thereacross, said resistor having a value less than one ohm.

16. A battery charging apparatus which comprises:
   (a) voltage source means for forming a DC charging current at a specified voltage to be applied to charge a battery;
   (b) a discharge circuit which connects from the positive terminal of a battery comprising a switch and a solid state controlled resistor means to selectively and controllably discharge the battery;
   (c) a charging circuit utilizing said voltage source connected in series with the battery and said solid state resistor means to controllably charge the battery;
   (d) wherein said switch is comprised of a transistor in said discharge circuit having a base adapted to be connected to a signal source switching said transistor off or on, said transistor functioning as a switch on connection of said transistor in the discharge circuit so that current flows through the collector and emitter thereof subject to gating of current flow by the base voltage.

17. The apparatus of claim 16 including a conductor connected to a voltage source means which forms a signal varied up or down dependent on operation of said voltage source means, thus forming the signal controlling current flow through said transistor.

18. The apparatus of claim 15 including a current amplifier connected to said signal source for amplifying the signal current to an elevated level, and wherein said transistor is duplicated by a selected number of transistors connected in parallel to cooperatively function as a switch when said transistors are switched on.

19. The apparatus of claim 16 wherein said voltage source means includes
   a transformer having a turns ratio to provide a selected DC level;
   a rectifier bridge circuit connected to the secondary of said transformer to form a pulsating DC current output;
   a smoothing capacitor connected to said bridge circuit to reduce the ripple in the DC current output; and
   a diode positioned and connected to deliver DC charging current from said bridge circuit to the battery to be charged, said diode blocking the flow of current from the battery to said bridge circuit when said transformer is not connected to an AC source.

* * * * *